United States Patent
Mathur et al.

(10) Patent No.: US 10,392,481 B2
(45) Date of Patent: Aug. 27, 2019

(54) HIGH STRENGTH POLYETHYLENE PRODUCTS AND A PROCESS FOR PREPARATION THEREOF

(71) Applicant: Reliance Industries Limited, Mumbai (IN)

(72) Inventors: Ajit Behari Mathur, Vadodara (IN); Satya Srinivasa Rao Gandham, Vadodara (IN); Uma Sankar Satpathy, Vadodara (IN); Krishna Renganath Sarma, Vadodara (IN); Yogesh Popatrao Patil, Vadodara (IN); Nanubhai Fuljibhai Patel, Vadodara (IN); Gaurang Manilal Mehta, Vadodara (IN); Raksh Vir Jasra, Vadodara (IN)

(73) Assignee: Reliance Industries Limited, Maharashtra, Mumbai (IN)

( * ) Notice: Subject to any disclaimer, the term of this patent is extended or adjusted under 35 U.S.C. 154(b) by 720 days.

(21) Appl. No.: 14/892,791

(22) PCT Filed: May 26, 2014

(86) PCT No.: PCT/IN2014/000357
§ 371 (c)(1),
(2) Date: Nov. 20, 2015

(87) PCT Pub. No.: WO2014/192025
PCT Pub. Date: Dec. 4, 2014

(65) Prior Publication Data
US 2016/0090453 A1    Mar. 31, 2016

(30) Foreign Application Priority Data
May 26, 2013    (IN) .......................... 3365/MUM/2012

(51) Int. Cl.
*B29L 7/00*    (2006.01)
*C08J 5/00*    (2006.01)
(Continued)

(52) U.S. Cl.
CPC ............... *C08J 5/00* (2013.01); *B29C 43/006* (2013.01); *B29C 43/24* (2013.01); *B29C 43/46* (2013.01);
(Continued)

(58) Field of Classification Search
CPC ....... B29C 43/006; B29C 43/24; B29C 43/46; C08J 5/00; C08J 2323/06; C08F 110/02;
(Continued)

(56) References Cited

U.S. PATENT DOCUMENTS 4,436,689 A    3/1984    Smith et al.
5,002,714 A *  3/1991    Sano ................... B29C 47/0004
                                                         264/119

(Continued)

FOREIGN PATENT DOCUMENTS

EP         2036942          3/2009
JP         2005313391       11/2005
(Continued)

OTHER PUBLICATIONS

International Search Report of the International Searching Authority dated Aug. 14, 2013, issued in connection with International Patent Appln. No. PCT/IN2013/000016 (3 pages).
(Continued)

*Primary Examiner* — Jeffrey M Wollschlager
(74) *Attorney, Agent, or Firm* — McCarter & English, LLP (57) ABSTRACT

The present disclosure relates to a process for the preparation of high strength and high modulus polyethylene products/laminates consisting of steps such as providing a pre-
(Continued)

dried, at least 50% disentangled ultra-high molecular weight polyethylene (UHMWPE) powder, feeding the UHMWPE powder having temperature ranging from −15° C. to 50° C., at the nip of at least one pair of heated, polished counter rotating calendaring rollers, rotating at different roller speeds to obtain at least one pre-laminate and hot stretching the pre-laminate(s) at a pre-determined temperature and pre-determined stretching speed to obtain high strength laminates. The laminates provided by the present disclosure have tensile strength ranging between 0.5 GPa and 3.0 GPa and tensile modulus ranging between 40 GPa and 200 GPa.

9 Claims, 4 Drawing Sheets (51) Int. Cl.
 B29C 43/24 (2006.01)
 B29K 23/00 (2006.01)
 B32B 27/32 (2006.01)
 B29K 105/00 (2006.01)
 B29K 105/16 (2006.01)
 C08F 110/02 (2006.01)
 B29C 43/46 (2006.01)
 B29C 43/00 (2006.01)
(52) U.S. Cl.
 CPC ............ *B32B 27/32* (2013.01); *C08F 110/02* (2013.01); *B29K 2023/0683* (2013.01); *B29K 2105/0032* (2013.01); *B29K 2105/0044* (2013.01); *B29K 2105/16* (2013.01); *B29K 2995/0077* (2013.01); *B29L 2007/007* (2013.01); *C08J 2323/06* (2013.01)
(58) Field of Classification Search
 CPC ............ B32B 27/32; B29K 2023/0683; B29K 2105/16; B29K 2105/0032; B29K 2105/0044; B29K 2995/0077; B29L 2007/007

See application file for complete search history.

(56) References Cited

U.S. PATENT DOCUMENTS

| | | | |
|---|---|---|---|
| 5,091,133 A * | 2/1992 | Kobayashi | B29C 43/003 264/119 |
| 5,693,708 A | 12/1997 | Iwanami et al. | |
| 5,756,660 A * | 5/1998 | Shiraishi | B29C 55/18 528/502 B |
| 2004/0048958 A1* | 3/2004 | Didier | C08K 5/1345 524/128 |
| 2008/0085982 A1* | 4/2008 | Smith | B29C 43/006 526/352 |
| 2008/0251960 A1* | 10/2008 | Harding | B29C 43/228 264/119 |
| 2011/0207907 A1 | 8/2011 | Simmelink | |
| 2011/0268952 A1* | 11/2011 | Eem Van Der | B29C 55/065 428/220 |

FOREIGN PATENT DOCUMENTS

| | | |
|---|---|---|
| WO | WO 2009/153318 | 12/2009 |
| WO | WO2010007062 * | 1/2010 |
| WO | WO2013037811 * | 3/2013 |
| WO | WO 2013/076733 | 5/2013 |
| WO | WO 2013/118140 | 8/2013 |

OTHER PUBLICATIONS

International Search Report of the International Searching Authority dated Nov. 20, 2014, issued in connection with International Patent Appln. No. PCT/IN2014/000357 (3 pages).
Indian Patent Application No. 1440/MUM/2013, filed on Apr. 17, 2013 entitled A Novel Transition Metal Based Polymerization Catalyst and a Process for Preparation Thereof (18 pages).

* cited by examiner

HIGH STRENGTH POLYETHYLENE PRODUCTS AND A PROCESS FOR PREPARATION THEREOF

RELATED APPLICATIONS

This application is a U.S. National Phase Application under 35 U.S.C. 371 of International Application No. PCT/IN2014/000357 filed May 26, 2014, which claims the benefit of Indian Patent Application No. 3365/MUM/2012 filed on May 26, 2013. The disclosures of these applications are incorporated herein by reference in their entireties.

FIELD OF INVENTION

The present disclosure relates to polyethylene products. More particularly, the present disclosure relates to high strength and high modulus polyethylene laminates.

DEFINITIONS OF TERMS USED IN THE SPECIFICATION

As used in the present disclosure, the following words and phrases are generally intended to have the meaning as set forth below, except to the extent that the context in which they are used to indicate otherwise.

The term 'pre-laminates' has been used in the present disclosure to describe the preforms obtained after calendar rolling cooled ultra-high molecular weight powder, which after hot stretching, form the high strength laminates of the present disclosure.

The term 'laminates' has been used in the present disclosure to describe products such as sheets, films and tapes that may be single layered or multilayered.

The term 'disentangled' is used to describe ultrahigh molecular weight polyethylene-homo-polymer(s) or copolymer(s) of ethylene having molar mass in the range of 0.3 million to 20 million; crystallinity greater than 75%; heat of fusion greater than 200 J/g and bulk density ranging from 0.048 to 0.3 g/cc, wherein the polyethylene chains have low entanglement or are completely disentangled.

BACKGROUND OF THE INVENTION

Disentangled ultra-high molecular weight polyethylene (UHMWPE) when subjected to specialized processing, yields polyethylene products having extremely high strength and modulus—a consequence which is attributed to the uniform and parallel orientation of the polymer chains of disentangled UHMWPE, when subject to processing techniques such as hot stretching. As a virtue of their characteristic physical properties, these extremely high strength polyethylene products have found abundant applications in diverse areas such as adventure sports, research laboratories, medical devices, aeronautical environments and the like.

Conventionally, traditional heterogeneous stereo-specific catalysts have been used in the preparation of UHMWPE, which is further used for preparing high strength polyethylene products. However, the UHMWPE that results, is present in a highly entangled state. The entangled nature of the polymer decreases the melt processability by conventional processing tools; thereby limiting the efficient preparation of the high strength products.

U.S. Pat. No. 4,436,689 and US Publication No. 2011/0207907 disclose a process known as gel spinning for preparing very high strength polyethylene products from entangled UHMWPE. The processes disclosed in the afore-stated prior art documents, however, essentially require a step of solvent removal which is expensive and time consuming. Also, in order to prepare films and tapes of very high strength from UHMWPE, the latter needs to be subjected to compression molding before rolling and hot stretching. For instance, the PCT document WO 2009/153318 discloses a process for the preparation of very high strength polyethylene product that includes the process steps of compacting the UHMWPE, followed by rolling, followed by hot stretching. This not only makes the process more expensive and time consuming, but also lowers the efficiency of the overall process. Furthermore, the process disclosed in the PCT document WO 2009/153318 professes heating the UHMPWE powder before dosing which necessitates more energy and time input.

Therefore, there is a need to develop a process for the preparation of high strength products of UHMWPE that reduces the drawbacks of the prior art processes.

OBJECTS

Some of the objects of the present disclosure which at least one embodiment is adapted to provide, are described herein below:

It is an object of the present disclosure to provide polyethylene products or laminates with high strength and high modulus.

It is another object of the present disclosure to provide a process for preparing polyethylene products with high strength and high modulus, which is rapid, economical and environment friendly.

It is still another object of the present disclosure to provide a process for preparing polyethylene products with extremely high strength and high modulus, which is continuous, simple and efficient.

Other objects and advantages of the present disclosure will be more apparent from the following description when read in conjunction with the accompanying figures, which are not intended to limit the scope of the present disclosure.

SUMMARY

The present disclosure provides a process for the preparation of high strength polyethylene laminates; said process comprising the following steps:
i. providing a pre-dried, at least 50% disentangled ultra-high molecular weight polyethylene (UHMWPE) powder;
ii. feeding said UHMWPE powder having temperature ranging from −15° C. to 50° C. at the nip of at least one pair of heated, polished counter rotating calendaring rollers, rotating at different roller speeds to obtain at least one pre-laminate; and
iii. hot stretching said pre-laminate(s) at a pre-determined temperature and pre-determined stretching speed to obtain high strength laminates,
wherein said laminates are selected from the group consisting of sheets and films.

The present process further includes incorporating at least one antioxidant, in any process step.

In accordance with the present process, the antioxidant is Tetrakis-(methylene-(3,5-di(tert)-butyl-4-hydrocinnamate)) methane.

In accordance with the present process, the high strength polyethylene laminates are transparent.

The present disclosure further provides single layered high strength laminates prepared by the afore-stated process, being characterized by tensile strength ranging between 0.5 GPa and 3.0 GPa and tensile modulus ranging between 40 GPa and 200 GPa.

The present process further includes the step of collectively passing said pre-laminates between at least one pair of calendaring rollers before the step of hot stretching to obtain high strength multilayered polyethylene laminates.

The present disclosure even further provides multilayered high strength polyethylene laminates prepared by the aforestated process, being characterized by tensile strength ranging between 0:5 GPa and 3.0 GPa and tensile modulus ranging between 40 GPa and 200 GPa.

In accordance with the present process, the UHMWPE powder fed at the nip of the calendaring rollers has a temperature ranging from −5° C. to 28° C.

In accordance with the present process, the heated calendaring rollers have a temperature below the melting point of the UHMWPE.

In accordance with the present process, the step of hot stretching the pre-laminate(s) is preceded by the step of slitting said pre-laminate(s) to obtain said laminates in the form of tapes.

The present process includes the step of adding at least one additive in said UHMWPE powder.

The present process includes incorporating at least one additive along with the cooled UHMWPE powder, at the nip of said pair of calendaring rollers.

The present process includes admixing at least one additive in the pre-laminate(s) before hot stretching.

In accordance with the present process, the additive is at least one selected from the group consisting of coloring agents and fillers.

In accordance with the present process, the additive is at least one selected from the group consisting of carbon black, titanium dioxide, talc, carbon fiber, graphite powder and graphite fiber.

In accordance with the present process, the pre-determined temperature is a temperature below the melting point of the UHMWPE.

In accordance with the present process, the pre-determined stretching speed ranges from 10 to 60 mm/min.

The present disclosure still further provides a pre-laminate characterized by luminous transmittance ranging between 90% and 95% and haze ranging between 10% and 50%; wherein said pre-laminate is prepared by the following steps:
  i. providing a pre-dried, at least 50% disentangled ultrahigh molecular weight polyethylene (UHMWPE) powder; and
  ii. feeding said UHMWPE powder having temperature ranging from −15° C. to 50° C. at the nip of at least one pair of heated, polished counter rotating calendaring rollers, rotating at different roller speeds to obtain at least one pre-laminate.

The afore-stated process further includes incorporating at least one antioxidant, in any process step.

In accordance with the afore-stated process, the pre-laminate is transparent.

The afore-stated process further includes the step of collectively passing the pre-laminates between at least one pair of calendaring rollers to obtain multilayered pre-laminates.

The present disclosure even further provides multilayered pre-laminates prepared according to the afore-stated process.

The present disclosure even further provides a pre-laminate characterized by thickness ranging between 50 microns and 500 microns, density ranging between 0.95 g/cc and 1.5 g/cc, X-ray crystallinity greater than 75%, wherein said pre-laminate is prepared by the following steps:
  i. providing a pre-dried, at least 50% disentangled ultrahigh molecular weight polyethylene (UHMWPE) powder;
  ii. feeding said UHMWPE powder having temperature ranging from −15° C. to 50° C. at the nip of at least one pair of heated, polished counter rotating calendaring rollers, rotating at different roller speeds to obtain at least one pre-laminate; and
  iii. incorporating at least one additive.

The afore-stated process further includes incorporating at least one antioxidant, in any process step.

In accordance with the afore-stated process, the additive is at least one selected from the group consisting of coloring agents and fillers.

In accordance with the afore-stated process, the additive is at least one selected from the group consisting of carbon black, titanium dioxide, talc, carbon fiber, graphite powder and graphite fiber.

The present process further includes the step of collectively passing said pre-laminates between at least one pair of calendaring rollers to obtain multilayered pre-laminates.

In accordance with the afore-stated process, the additive is incorporated in at least one layer.

The present disclosure still further provides a multilayered pre-laminate prepared according to the afore-stated process.

BRIEF DESCRIPTION OF THE DRAWINGS

The disclosure will now be explained in relation to the non-limiting accompanying drawings, in which.

DETAILED DESCRIPTION OF THE INVENTION

The present disclosure provides a process for the preparation of polyethylene products or laminates having very high strength and modulus that may be used for diversified applications such as adventure sports, research laboratories, medical devices and aeronautical environments.

The process of the present disclosure initially includes providing a pre-dried and disentangled ultra-high molecular weight polyethylene (UHMWPE) powder. The present process makes use of at least 50% disentangled UHMWPE as its parallel, orderly, long chains provide an extremely high strength and modulus. This is because large macromolecules when present in an orderly fashion are predisposed to orient themselves in the direction of applied stress, providing better physical properties.

Typically, the disentangled UHMWPE of the present disclosure is prepared by polymerizing ethylene with or without a comonomer (alpha-olefin in the range of $C_3$ and above) using a single site catalyst, as described in WO2013076733, PCT/IN2013/000016 and 1440/MUM/2013. The reaction pressure is maintained at sub-ambient, ambient or higher than ambient and the reaction temperature is 10° C. or above. A range of polymers can be prepared by using a single site immobilized catalyst system. The resultant polymers have been characterized for Reduced Specific Viscosity (RSV) by ASTM-D 4020-1a; molecular weight by the Mark-Houwink equation: $M=K[\eta]^{\alpha}$, where K and $\alpha$ are constants, $K=53700$, $\alpha=1.37$ and $\eta$—intrinsic viscosity; bulk density by ASTM D-1895; molecular weight distribution by melt rheometry using Rheometrics RDA-III from T A Instruments employing Orchestrator software; density by ASTM D 792 using measuring unit of Mettler Toledo; melting temperatures (Tm) and heat of fusion during melting ($\Delta$HTm). The molecular weight distribution of the resultant UHMWPE has been found to be 2 and above; the RSV has been found to be 17 dl/g and above, $\Delta$U above 200 J/g and the bulk density has been found to be 0.3 g/cc or below. The UHMWPE powder formed as a result of the afore-stated process is thus highly crystalline and richly disentangled.

The UHMWPE powder, however, has a tendency of building up static charge, being nonpolar and of a very low bulk density. It further escalates with an increase in the temperature which adversely affects the compacting of the polymer powder and thereby density and uniformity of density of pre-laminate. Additionally, such a static charge build-up can become a potential fire hazard and therefore cumulatively hinders the preparation of high strength laminates or products. The throughput of the process is also adversely affected. Therefore, the UHMWPE powder is cooled to a temperature ranging from −15° C. to 50° C. in order to reduce the static charge build up. Typically, the temperature at which the UHMWPE powder is cooled ranges from −5° C. to 28° C.

Figure 1:
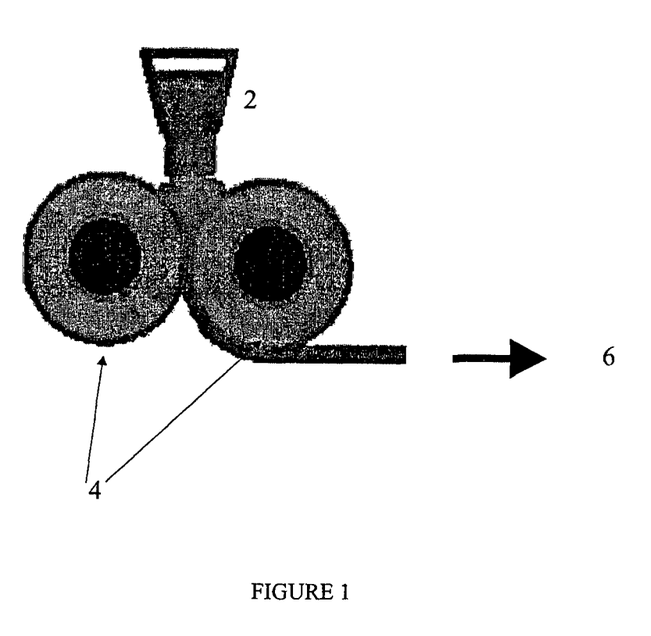
FIG. 1 illustrates the process for making a pre-laminate using a pair of calendaring rollers and a processing line for processing the pre-laminate to obtain a laminate;
wherein 2 represents the feed hopper,
  4 represents the calendaring rollers, and
  6 represents the processing line.

Such a cooled UHMWPE powder is then fed at the nip of at least one pair of heated, polished counter rotating calendaring rollers, rotating at different speeds, to obtain at least one pre-laminate having high density. This process step has been demonstrated in FIG. 1 where the feed hopper has been represented by 2, the calendaring rollers have been represented by 4 and 6 represents a processing line for processing the pre laminate to obtain a laminate. Characteristically, the two rollers in the calendaring roller pair have different roller speeds. This ensures high density of the resultant pre-laminates. The temperature of the rollers is maintained below the melting point of the UHMWPE in order to achieve effective calendaring. Optionally, at least one antioxidant is added, in any order, at any point in, the afore-stated process in order to improve the in-process stability of the polymer. In one embodiment, Tetrakis-(methylene-(3,5-di(tert)-butyl-4-hydrocinnamate))methane is used as an antioxidant. Such a pre-laminate is characterized by having luminous transmittance ranging between 90% and 95% and haze ranging between 10% and 50%. Typically, the pre-laminate is of transparent nature, depending on the type and quantity of additives, if added. If the afore-stated pre-laminates are collectively made to pass through at least one pair of calendaring rollers, multilayered pre-laminates result. These multilayers may or may not have additives in every layer.

The pre-laminate(s) emerging from the calendaring rollers are then hot stretched at a temperature below the melting point of the UHMWPE and at a stretching speed ranging from 10 to 60 mm/min to obtain high strength laminates or products. Whenever the pre-laminate is transparent, the laminate is also transparent. The high strength laminates of the present disclosure include sheets and films. However, when laminates in the form of tapes are to be prepared, the pre-laminates emerging from the calendaring rollers are split before hot stretching.

In one embodiment, the cooled UHMWPE powder when fed at the nip of just one pair of counter rotating calendaring rollers, emerges from the rollers in the form of a pre-laminate and upon hot stretching forms a single-layered high strength polyethylene laminate.

However, the cooled UHMWPE powder when simultaneously fed at the nip of more than one pair of counter rotating calendaring rollers, emerges from the rollers in the form of corresponding number of pre-laminates and these pre-laminates when collectively passed between more than one pair of calendaring rollers before the step of hot stretching, forms multi-layered high density polyethylene pre-laminates.

Figure 2A:
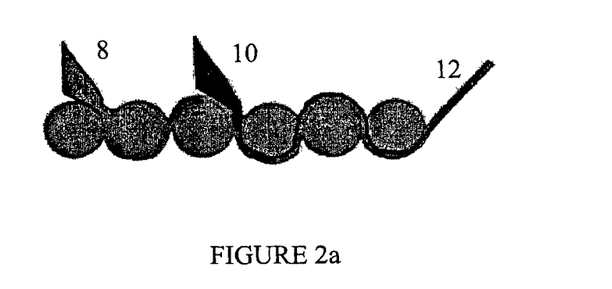
FIG. 2a illustrates a series configuration of the calendaring rollers to produce multi-layered laminates;
wherein 8 represents the Feed Point 1,
  10 represents the Feed Point 2, and
  12 represents the multi-layered laminate after hot stretching.
Figure 2B:
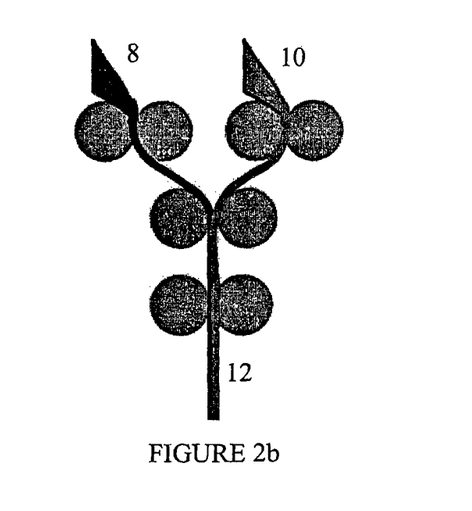
FIG. 2b illustrates a parallel configuration of the calendaring rollers to produce multi-layered laminates;
wherein 8 represents the Feed Point 1,
  10 represents the Feed Point 2, and
  12 represents the multi-layered laminate after hot stretching.

FIGS. 2(a) and 2(b) demonstrate the process for the preparation of multi-layered laminates; wherein FIG. 2(a) represents the process of multi-layer formation in series and FIG. 2(b) represents the process of multi-layer formation in parallel.

The laminates, single layered and multilayered, obtained by conducting the process of the present disclosure typically have tensile strength ranging between 0.5 GPa and 3.0 GPa and tensile modulus ranging between 40 GPa and 200 GPa.

In order to further improve the properties of the laminates, inclusion of at least one additive may be effected, in any order, in the present process. In one embodiment, the additive(s) is added in the UHMWPE powder, before or after cooling. In another embodiment, the additive(s) along with the cooled UHMWPE powder is incorporated at the nip of the pair of the calendaring rollers. In yet another embodiment, the additive(s) is admixed in the pre-laminate(s) before hot stretching. The additive(s) that may be used in the present process is at least one selected from the group consisting of coloring agents and fillers. Typically, the additives are selected from carbon black, titanium dioxide, talc, carbon fiber, graphite powder, graphite fiber and combinations thereof. This way, different functionalities may be incorporated in the single and/or multilayered pre-laminate(s) and laminate(s) depending of the properties of the additives. In case of multi-layered pre-laminate(s) and laminate(s), the type and number of functionalities will depend on the additives present in each layer. The pre-laminate(s) containing additive(s) prepared as a result of the afore-stated process, have thickness ranging between 50 microns and 500 microns, density ranging between 0.95 g/cc and 1.5 g/cc and X-ray crystallinity greater than 75% and are not transparent, unlike the pre-laminates that do not contain additives. This is because when additives such as coloring agents and fillers are present in the pre-laminates and/or laminates, they scatter light; thereby hampering its transparency.

The present invention will now be further described with reference to the following examples which are to be regarded solely as illustrative and not as restricting the scope of the present invention.

EXAMPLE 1

Process Optimization—Cooling Temperature of the UHMWPE Powder

Figure 3:
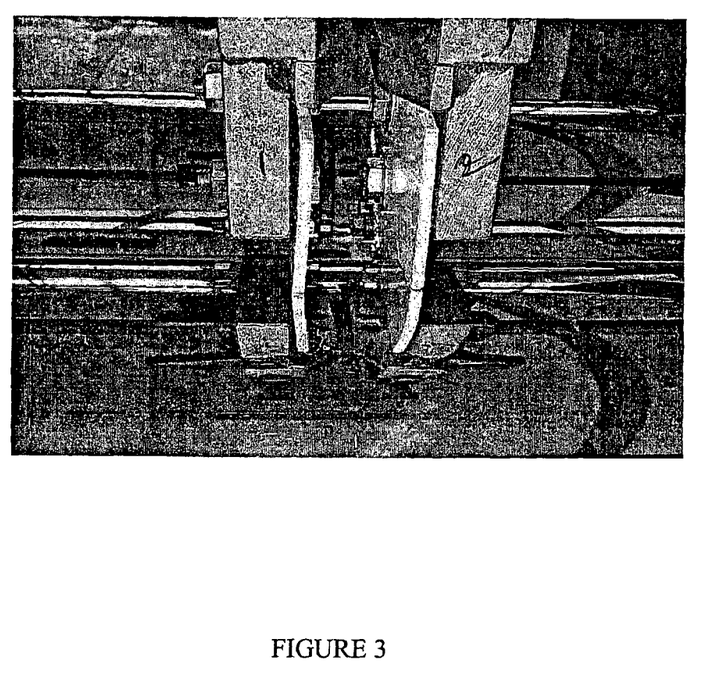
FIG. 3 illustrates the gap setting on the calendar roller for adjusting the width of the pre-laminate.

Disentangled UHMWPE prepared in accordance with the process stated in the description, having 7.1 million g/mol as the molecular weight, 35.62 dl/g as the RSV, 94.9% as the X-crystallinity and 0.067 g/cc as the bulk density, was dried in a vacuum oven at 80° C. for 4 hours and stabilized with 5000 ppm of Tetrakis-(methylene-(3,5-di(tert)-butyl-4-hydrocinnamate))methane as the primary antioxidant. The dried admixture was cooled to different temperatures such as −15, −5, 0, 15, 28 and 50° C. in a sealed glass container for 2 hours before feeding at the nip of the calendar roll machine having 150 mm as the roller diameter and 340 mm as the operation width. In order to control the width of the pre-laminate, two barriers of teflon sheet were placed between the rollers without allowing them to touch the roller walls (as demonstrated in FIG. 3). The temperature of the rollers was set at 125° C., about 16° C. lower than the polymer melt temperature. The roller speed and ratio of the speed of the rollers was maintained as 0.88 m/min and 1.156, respectively. The resultant pre-laminate was studied for its physical characteristics.

Observations:

TABLE 1

Effect of the UHMWPE powder temperature on the homogeneity and density of the pre-laminate

| Temperature of UHMWPE powder, ° C. | Compacted area of the pre-laminate, % | Density of the pre-laminate, g/cc |
| --- | --- | --- |
| −15 | 83 | 0.9889 |
| −5 | 84 | 0.9888 |
| 0 | 95 | 0.9894 |
| 15 | 86 | 0.9943 |
| 28 | 81 | 0.9894 |
| 50 | 77 | 0.9866 |

Figure 4:
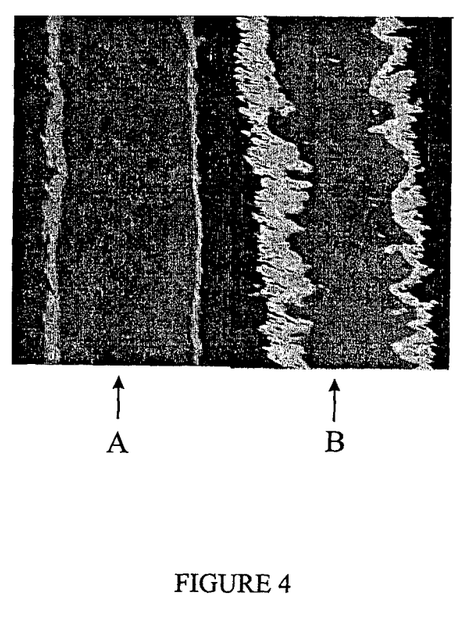
FIG. 4 demonstrates the effect of the cooling temperature of the UHMWPE powder on the morphology of the pre-laminate, wherein:
A represents the pre-laminate formed when the temperature of the UHMWPE powder is lower; and
B represents the pre-laminate formed when the temperature of the UHMWPE powder is higher.

- The thickness of the pre-laminate obtained was 0.115±0.010 mm.
- The total width of the pre-laminate was found as 3.75 cm.
- The manner of compaction (uniform or non-uniform; wavy or non-wavy) of the pre-laminate varied with temperature of the polymer powder at the time of feeding at the nip of the rollers (FIG. 4).
- It was found that the temperature range for effectively maintaining the homogeneity of the pre-laminate is above −15° C. and below 28° C. and more particularly between −5° C. and 15° C.
- The density of the pre-laminate was measured at 24° C. as per ASTM D792. It was found that the density of the pre-laminate was high when the temperature of the UHMWPE powder, before introduction at the nip, was kept above −15° C. and below 28° C. (Table 1).
- The calculated area by weight of the film per unit length depicts the compacted homogeneous portion of the pre-laminate, which was found to be high when the powder temperature ranged from −5° C. to 15° C. and was lowest at 50° C. (Table 1).

The same experiment was carried out by maintaining the roller temperature to 110° C. and results comparable to those presented hereinabove were obtained.

EXAMPLE 2

Process Optimization—Roller Speed Ratio 2 samples of disentangled UHMWPE powder prepared in accordance with the process stated in the description, one characterized by molecular weight (MW): 5.16 million g/mol, RSV: 28 dl/g, X-ray crystallinity: 96% and bulk density 0.11 g/cc and the other characterized by molecular weight: 7.1 million g/mol, RSV 35.62 dl/g, crystallinity 94.9% and bulk density 0.67 g/cc were dried in a vacuum oven at 80° C. for 4 hours and stabilized, each with 5000 ppm of Tetrakis-(methylene-(3,5-di(tert)-butyl-4-hydrocinnamate))methane as the primary antioxidant. These powder mixtures were independently cooled to 12° C. and fed at the nip of a calendar roll machine having 150 mm as the roller diameter and 340 mm as the operation width to prepare polymer pre-laminates. In order to control the width of the pre-laminate, two barriers of teflon sheet were placed between the rollers without touching the roller walls. The temperature of the roller was set at 125° C. The roller speed ratio was increased while keeping the speed of one roller as 0.88 m/min. The thickness of the pre-laminate was maintained as 0.09±0.01 mm. The density and haze values of the resultant pre-laminate were measured. The density of the pre-laminate was measured at 24° C. as per ASTM D792. The haze of the pre-laminates was measured by using Spherical Hazemeter (Model: EEL57) of M/s Diffusion System Ltd. An increase in the roller speed ratio resulted in an increase in the haze value and a decrease in the compact density of the pre-laminates (Table 2).

TABLE 2

Change in density and haze of the pre-laminates with a change in the roller speed ratio

| MW of Polymer | Speed of roller 1, m/min | Speed of roller 2, m/min | Roller speed ratio | Pre-laminate Density, g/cc | Haze, % |
| --- | --- | --- | --- | --- | --- |
| 5.16 million g/mol | 1.66 | 0.88 | 1.89 | 0.9707 | 40 |
|  | 0.76 | 0.88 | 0.86 | 0.9860 | 29 |
| 7.1 million g/mol | 1.66 | 0.88 | 1.89 | 0.9860 | 45 |
|  | 0.76 | 0.88 | 0.86 | 0.9877 | 28 |

EXAMPLE 3

Characterization—Luminous Transmittance

UHMWPE having molecular weight of 5.14 million g/mol, molecular weight distribution of 5.2 and bulk density of 0.055 g/cc was cooled to 15° C. and fed at the nip of a pair of counter rotating rollers (the temperature of the rollers was varied) having 1.10 as the roller speed ratio to obtain pre-laminates. The luminous transmittance of the resultant pre-laminates is as follows:

TABLE 3

Luminous transmittance of the pre-laminates

| Sr. no. | Temperature of rollers, °C. | Thickness, Microns | Luminous transmittance, % |
|---|---|---|---|
| 1 | 125 | 50 | 90 |
| 2 | 110 | 55 | 90 |
| 3 | 100 | 50 | 91 |
| 4 | 125 | 55 | 90 |

EXAMPLE 4

Process Optimization—Use of Disentangled as Well as Entangled UHMWPE 10 grams of Disentangled UHMWPE powder (MW: 5.0 million g/mol, MWD: 5.0, RSV: 27.4 dl/g, bulk density: 0.0486 g/cc) and commercial entangled UHMWPE (MW: 5.2 million g/mol) (2.5 grams) were powder mixed and calendar rolled at 130° C. while keeping the speed as 40.4 m/h and roller speed ratio 1.14. A pre-laminate of width 42 mm and thickness 150 micron was obtained in which entangled UHMWPE was well dispersed in disentangled UHMWPE.

A similar pre-laminate was also prepared by mixing 10 grams each of the above two polymers while keeping all other processing conditions same.

EXAMPLE 5(a)

Preparation of High Strength Laminates/Products According to the Present Disclosure Disentangled UHMWPE powder (MW: 5.0 million g/mol, MWD: 5.0, RSV: 27.4 dl/g, bulk density: 0.0486 g/cc), prepared in accordance with the process stated in the description, was stabilized with 5000 ppm of the primary anti-oxidant Tetrakis-(methylene-(3,5-di(tert)-butyl-4-hydrocinnamate))methane, cooled to 15° C. and fed at the nip of two heated calendaring rollers (temperature: 125° C.) having the roller speed and roller speed ratio as 0.32 meter/min and 1.1, respectively. The gap between the rollers was maintained at 0.15 mm. The width of the sheet was maintained at 90 mm by using Teflon spacers. The thickness of the pre-laminate obtained was 200 microns. The pre-laminate was capable of being wound using suitable rollers. The width of the sheet was increased up to 160 mm by spreading the polymer powder between the rollers. The pre-laminate so prepared was stretched 72 times in an oven maintained at 125° C. for providing a stretched laminate of 0.02 mm thickness, 1.82 GPa tensile strength and 105 GPa tensile modulus. The same sheet when stretched 52 times under similar conditions provided a laminate, in the form of a tape (upon splitting), of 1.79 GPa tensile strength and 90 GPa tensile modulus.

EXAMPLE 5(b)

Preparation of High Strength Laminates/Products According to the Present Disclosure A pre-laminate of thickness 150 micron and width 50 mm was prepared by using a vacuum dried (temperature 80° C.) disentangled UHMWPE of 5.0 million g/mol molecular weight, RSV: 27.3 dl/g, bulk density: 0.063 g/cc and X-ray crystallinity 89.% using calendar roll machine as in Example 1. The polymer powder temperature was maintained at 20° C. during feeding in the nip of the rollers. The speed and roller speed ratio was maintained as 40.4 m/h and 1.14, respectively. The roller temperature was maintained 16° C. below the melt temperature of the polymer.

The pre-laminate was slit into tapes of 12 mm width and subsequently hot stretched in the temperature range of 130-150° C. The temperature was set in increasing order as the stretch ratio increased up to 85 during hot stretching. The transparent laminate of 8 micron was found to have tensile strength 3.0 GPa and tensile modulus of 154 GPa.

EXAMPLE 5(c)

Preparation of High Strength Laminates/Products According to the Present Disclosure Disentangled UHMWPE powder (molecular weight 5.4 million g/mol, bulk density 0.0489 g/cc), was cooled to 20° C. and calendar rolled to obtain a pre-laminate. The rollers were maintained at 125° C. and the roller speed ratio was 1.10. The thickness of the pre-laminate was maintained at 150 microns. The pre-laminate so prepared was hot stretched 72 times at 125° C. The tensile strength and modulus of the stretched sample were found to be 1.86 GPa and 105 GPa, respectively.

EXAMPLE 5(d)

Preparation of High Strength Laminates/Products According to the Present Disclosure Disentangled UHMWPE powder (molecular weight 3.3 million g/mol, RSV 20.4 dl/g, bulk density 0.070 g/cc, was cooled to 20° C. and calendar rolled to obtain a pre-laminate. The rollers were maintained at 125° C. and the roller speed ratio was 1.14. The resultant pre-laminate was hot stretched at the rate of 20 mm/min to about 183 times (including roller stretching) in two stages, maintaining the oven temperature at 125° C. and 137° C. in subsequent stages. The modulus value of the stretched sample was found to be 161 GPa.

EXAMPLE 6

Preparation of High Strength Laminates/Products by Incorporating Additives 100 grams of disentangled UHMWPE powder (MW: 5.4 million g/mol and bulk density 0.0489 g/cc), was dried in an air oven at 80° C., stabilized by mixing 5000 ppm of the antioxidant Tetrakis-(methylene-(3,5-di(tert)-butyl-4-hydrocinnamate))methane. The stabilized polymer powder was homogeneously mixed with 0.25 grams of carbon black (Ensaco 250G of M/s Timcal Graphite and Carbon) in a Brabender mixer. The polymer powder mixture so obtained was cooled to 20° C. and subjected to calendar rolling such that the roller speed ratio was 1.14; while maintaining the roller temperature at 133° C. The thickness of the resultant continuous pre-laminate was 100 microns. The calendar roll machine was of roller diameter: 155 mm and roller length: 230 mm. The sheet so prepared was slit into tapes of width 1.27 cm and stretched in the oven in two stages i.e. at 137° C. and subsequently at 140° C. The stretching speed was maintained as 20 mm/min. The tensile strength and tensile modulus of the stretched tape were found to be 1.80 GPa and 101 GPa respectively.

EXAMPLE 7(a)

Preparation of Multi-layered High Strength Laminates/Products According to the Process of the Present Disclosure 0.05 grams of carbon black and 0.025 grams of talc were independently mixed in 10 grams each of pre-dried, pre-cooled (18° C.) disentangled UHMWPE powder (MW: 5.4 million g/mol). The two homogeneously mixed powder samples were allowed to fall at the nip of a pair of calendaring rollers (having the roller speed ratio as 1.10 and maintained at a temperature of 135° C.) such that a single two layered pre-laminate, one with talc and one with carbon black, was formed. The thickness of the pre-laminate was about 200 microns.

Hot stretching of the pre-laminate was carried out at a temperature of 137° C. and at a stretching speed of 20 mm/min, up to a stretch ratio of 27. The tensile strength and tensile modulus of the laminate were found to be 1.0 GPa and 43 GPa, respectively.

EXAMPLE 7(b)

Preparation of Multi-layered High Strength Laminates/Products According to the Process of the Present Disclosure 0.05 grams of carbon black and 0.05 grams of titanium dioxide were independently mixed in 10 grams each of pre-dried, pre-cooled (18° C.) disentangled UHMWPE powder (MW: 5.4 million g/mol). The two homogeneously mixed powder samples were separately allowed to fall at the nips of two different pairs of calendaring rollers to obtain 2 different pre-laminates of 100 micron each. The temperature of the rollers was found to be 135° C. and the roller speed ratio was maintained at 1.10.

The two pre-laminates were then fed in a roll mill, allowing their separate conveyance through the converging rollers surface, keeping the roller temperature at 135° C. A single two layered pre-laminate of 180 microns was thus, obtained which was hot stretchable below the polymer melt temperature (below 140° C.) in the oven, to provide high strength laminates in the form of tapes (upon slitting).

The hot stretching of the pre-laminate was carried out at a temperature of 134-149° C. and at a stretching speed of 20 mm/min, up to a stretch ratio of 68. The tensile strength and tensile modulus of the laminate were found to be 1.6 GPa and 110 GPa, respectively.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal, the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Having described and illustrated the principles of the present invention with reference to described embodiments, it will be recognized that the described embodiments can be modified in arrangement and detail without departing from the scope of such principles. It should also be understood that the compositions, processes or methods described herein above are not related or limited to any particular type of manufacturing set up. Without departing from the scope of this invention, all standard processing additives can be used in any of the embodiment.

Many modifications of the present invention will be apparent to those skilled in the art to which the present invention applies. Further, it may be desirable to use some of the above-described features without the corresponding use of other features.

Technical Advantages

The present disclosure provides a process for preparing polyethylene products which eliminates steps such as removing solvents and compression molding or preforming.

The process of the present disclosure includes controlling the temperature of the UHMWPE powder before calendaring in order to improve the compact density of the pre-laminate.

The present disclosure provides a process for preparing polyethylene products which is fast and economical.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the preparation of high strength polyethylene laminates comprising the following steps:
   i. providing an uncompacted pre-dried, at least 50% disentangled ultra-high molecular weight polyethylene (UHMWPE) powder;
   ii. feeding said uncompacted UHMWPE powder having temperature ranging from −5° C. to 28° C. at the nip of at least one pair of heated counter rotating calendaring rollers, rotating at different roller speeds to obtain at least one pre-laminate; and
   iii. hot stretching said pre-laminate(s) at a pre-determined temperature below the melting point of the UHMWPE and pre-determined stretching speed in the range of 10 to 60 mm/min to obtain high strength polyethylene laminates,
   wherein said high strength polyethylene laminates are selected from the group consisting of sheets and films, and wherein said high strength polyethylene laminates are characterized by tensile strength ranging between 0.5 to 3.0 GPa and tensile modulus ranging between 40 to 200 GPa.

2. The process as claimed in claim 1, wherein said high strength polyethylene laminates are transparent, which is characterized by having a luminous transmittance ranging between 90% to 95% and a haze ranging between 10% to 50%.

3. The process as claimed in claim 1, wherein step (ii) comprises simultaneously feeding said uncompacted UHMWPE powder having temperature ranging from −5° C. to 28° C. between at least one second pair of calendaring rollers before the step of hot stretching to obtain high strength multilayered polyethylene laminates.

4. The process as claimed in claim 1, wherein said heated calendaring rollers have a temperature below the melting point of the UHMWPE.

5. The process as claimed in claim 1, in which the step of hot stretching the pre-laminate(s) is preceded by a step of slitting said pre-laminate(s) to obtain laminates in the form of tapes.

6. The process as claimed in claim 1, which includes the step of adding at least one additive in said uncompacted UHMWPE powder and/or in said pre-laminate(s).

7. The process of claim 6, in which said additive is selected from the group consisting of coloring agents and fillers.

8. The process as claimed in claim 6, wherein said additive is at least one selected from the group of coloring agents and fillers consisting of carbon black, titanium dioxide, talc, carbon fiber, graphite powder and graphite fiber.

9. The process of claim 6, in which said additive is an antioxidant Tetrakis(methylene-(3,5-di(tert)-butyl-4-hydrocinaamate))methane.

* * * * *